United States Patent [19]

Hashimoto

[11] Patent Number: 4,580,813
[45] Date of Patent: Apr. 8, 1986

[54] AUTOMATIC SEATBELT SYSTEM

[75] Inventor: Masakazu Hashimoto, Toyota, Japan

[73] Assignee: Toyota Jidosha Kabushiki Kaisha, Aichi, Japan

[21] Appl. No.: 665,523

[22] Filed: Oct. 26, 1984

[30] Foreign Application Priority Data

Dec. 6, 1983 [JP] Japan .................. 58-188745[U]

[51] Int. Cl.⁴ .............................................. B60R 21/10
[52] U.S. Cl. ...................................................... 280/804
[58] Field of Search ............... 280/802, 804; 297/468, 297/469, 476, 479

[56] References Cited

U.S. PATENT DOCUMENTS

| | | | |
|---|---|---|---|
| 4,241,940 | 12/1980 | Suzuki et al. | 280/804 |
| 4,343,489 | 8/1982 | Suzuki et al. | 280/804 |
| 4,345,781 | 8/1982 | Suzuki et al. | 280/802 |
| 4,475,745 | 10/1984 | Fohl | 280/804 |
| 4,498,690 | 2/1985 | Takada | 280/804 |

Primary Examiner—Richard A. Bertsch
Attorney, Agent, or Firm—Parkhurst & Oliff

[57] ABSTRACT

An automatic seatbelt system for use of a seated passenger in a vehicle. The automatic seatbelt has a movable shoulder anchor which is actuated by a motor. The rotation of the motor is transmitted through a ball wire which comprises balls having openings therein and a wire extending through the openings of the balls. The ball wire forwardly and rearwardly moves within a groove defined within a guide rail. An upper end of the seatbelt is connected to the slider which is located between the balls of the ball wire.

9 Claims, 5 Drawing Figures

AUTOMATIC SEATBELT SYSTEM

BACKGROUND OF THE INVENTION

The present invention relates to an automatic seatbelt system, and more particularly to an automatic seatbelt system which automatically fastens and unfastens a seatbelt on a passenger.

A typical type of an automatic seatbelt device has a guide rail fastened to a roof side which extends in a longitudinal direction of a vehicle, and a slider which moves within this guide to which an upper end of a passenger seatbelt is fastened. This slider is forwardly or rearwardly moved by a motor to actuate the passenger seatbelt to approach to or move back from the passenger, thereby automatically fastening and unfastening the seatbelt on the passenger.

Heretofore, there has been employed a plastic tape in order to move a slider on which an anchor of a shoulder belt is mounted. In the case that a plastic tape is employed in order to transmit the rotation of the motor to the slider, the stiffness of the plastic tape is considerable. Hence, when the plastic tape is retracted into a case in a large curvature, the sliding resistance is considerable, and this causes the large load on the motor. Further, the plastic tape has a large amount of rigidity when an external force is exerted on the plastic tape in the direction of the width of the tape.

These characteristics of a plastic tape necessitate a large space in which the plastic tape is retracted, and limits a flexibility of a design to determine how a seatbelt system is installed in a vehicle.

SUMMARY OF THE INVENTION

The present invention was made in view of the foregoing background and to overcome the foregoing drawbacks. It is accordingly an object of this invention to provide an automatic seatbelt system which enables a compact size.

To attain the above objects, an automatic seatbelt system for automatically fastening and unfastening a seatbelt on a seated passenger in a vehicle. The seatbelt system has an anchor to which an end of a seatbelt is connected, and a guide which is fixed to a vehicle body. The guide has a longitudinally extending groove in which the anchor is slidably mounted. The anchor is moved by a ball wire. The ball wire has a plurality of balls which have openings therein, and a wire which extends through the openings of the balls. The ball wire is connected with the anchor in such a condition as when the ball wire moves, the anchor is also moved by the ball wire. The ball wire is moved by a movement generated by a power sources such as a motor. When a vehicle door opens, the power sources generates a power, and this power is transmitted to the ball wire, thereby forwardly moving the seatbelt in the vehicle to enable a passenger to get in or out. Contrary to this, when the vehicle door closes, the ball wire is rearwardly moved, thereby rearwardly moving the seatbelt in the vehicle to enable the passenger to be fastened.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate an embodiment of the present invention.

Figure 3:
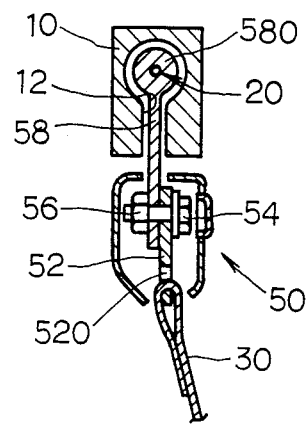
FIG. 3 is a cross-sectional view taken along the line III'III in FIG. 1.
Figure 4:
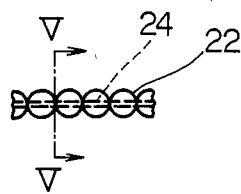
FIG. 4 is a cross-sectional view of a ball wire which is employed in the embodiment of the present invention.
Figure 5:
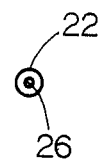
FIG. 5 is a cross-sectional view taken along the line V—V in FIG. 4.

A vehicle body has a front pillar 2, a center pillar 6, and a side portion 4 of a roof connecting the front pillar 2 with the center pillar 6. A guide rail 10 is provided along the front pillar 2, the side portion of the roof and the center pillar 6. The guide rail 10 is fixed to the vehicle body by clamps 100, 102, 104 and 106. The guide rail 10 has a groove 12 which extends in its longitudinal direction in a vehicle. A ball wire 20, as shown in FIG. 3, is fitted within the guide rail 10, in the condition that the ball wire 20 can be moved within the guide rail 10. The ball wire 20 comprises a plurality of balls 22 and a wire 24 which extends through openings 26 provided in the balls 22.

A webbing 30 extends from a retractor (not shown in the drawings) through an elongated slit 42 which is located at a side portion of a console box 40 and the upper end of the webbing 30 is connected to a through ring 52, as shown in FIG. 3. The through ring 52 has an opening 520 through which the upper end of the webbing 30 extends and turns down onto the webbing 30. The turned end of the webbing 30 is stitched onto the webbing 30 to form a closed loop. The through ring 52 is fixed by a bolt 54 and a nut 56 to a slider 58. The slider 58 upwardly extends within the groove 12 of the guide rail 10 as shown in FIG. 3, and the slider 58 has a top portion 580 of a round cross section. The top portion 580 is inserted between the balls 22 of the ball wire 20, thereby enabling the slider 58 to move with the balls 22. The portion at which the through ring 52 is fixed to the slider 58 by the bolt 54 and the nut 56, is covered with a protector 59. Thus, the through ring 52 and the slider 58 form a movable shoulder anchor 50.

Figure 1:
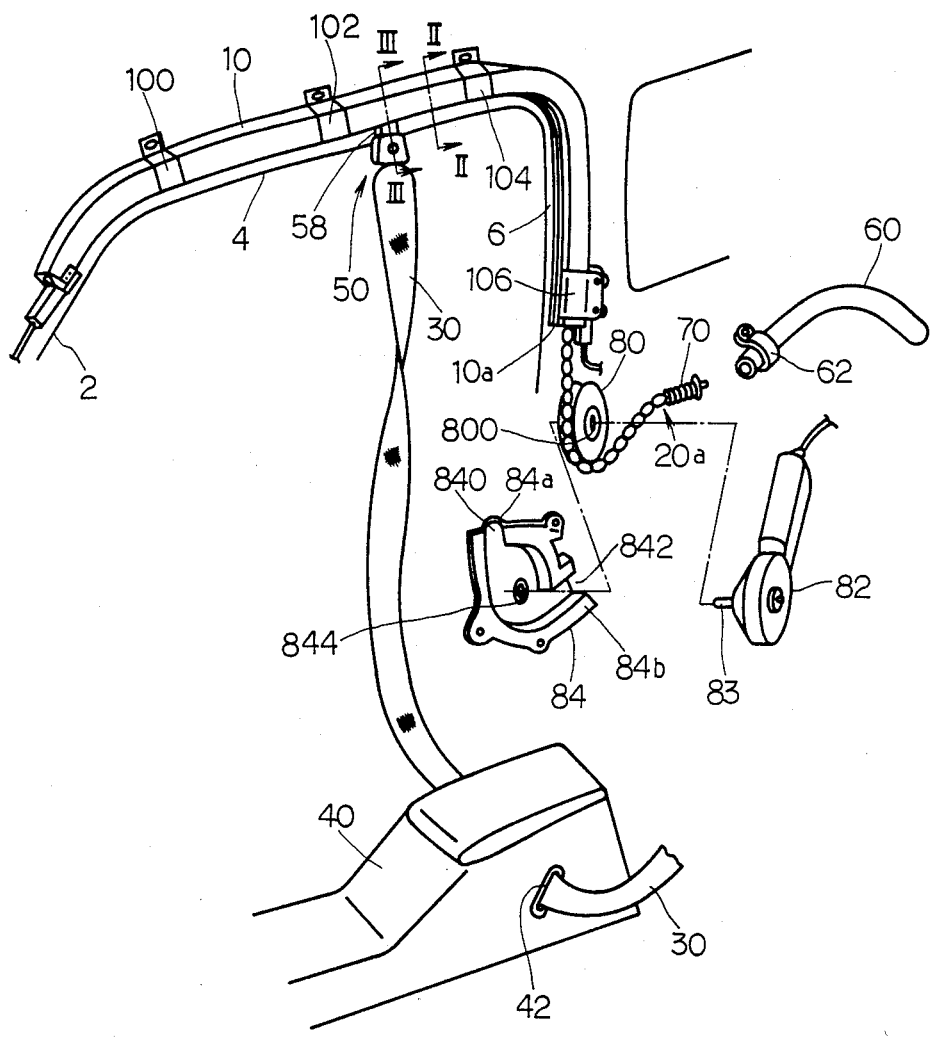
FIG. 1 is a perspective view of an automatic seatbelt system according to the embodiment of the present invention.
Figure 2:
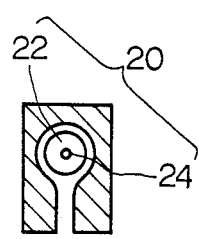
FIG. 2 is a cross-sectional view taken along the line II—II in FIG. 1.

As shown in FIG. 1, a rear end 20a of the ball wire 20 is subjected to a compressive force of a spring 70 which is provided within a flexible tube 60. As a result, the balls 22 are biased in one direction by the compressive force of the spring 70 so as to remain in contact with each other. Therefore, there is generally no clearance between the balls 22. Movement of the ball wire 20 is actuated by the rotation of a sprocket wheel 80. The sprocket wheel 80 is fixed onto the center pillar 6 and has a peripheral portion which the ball wire 20 contacts. The sprocket wheel 80 has an opening 800 in which a shaft 83 of a motor 82 is inserted. The sprocket wheel 80 is rotated by a motor 82. The opposite side of the sprocket wheel 80 to the side where the motor 82 is provided is surrounded by a frame 84. The frame 84 has passages 840 and 842 at points thereof where the passages 840 and 842 form a L-shaped passage for guiding the ball wire 20. The ball wire 20 extends through the passages 842 and 840 from the tube 60. The frame 84 is fixed onto the center pillar 6. An upper portion 84a of the frame 84 is fixed to an end 10a of the guide rail 10 and the tube 60 is fixed to an end 84b of the frame 84 by a clamp 62. The frame 84 has an opening 844 in which the shaft 83 of the motor 82 extends.

In operation, when the door opens, the motor 82 rotates, and this rotation is transmitted to the sprocket wheel 80, thereby rotating the sprocket wheel 80. As the ball wire 20 contacts on the peripheral portion of the sprocket wheel 80, the ball wire 20 moves in the forward direction of the vehicle. When the ball wire 20 moves in the forward direction of the vehicle, the shoulder anchor 50 forwardly moves along the guide rail 10. The webbing 30 also moves forwardly, thereby forming a large space between the webbing 30 and the seat. Hence, a passenger can easily get in or out.

Subsequently, when the door closes, the motor 82 rotates in the opposite direction to that when the door opens, the webbing 30 moves rearwardly toward the seated passenger, thereby automatically fastening the seatbelt on the passenger.

In the above embodiment, only the seatbelt system for the right seat of a vehicle is explained. Another similar system is provided for the left seat.

While the present invention has been described in its preferred embodiment, it is to be understood that the invention is not limited thereto, and may be otherwise embodied within the scope of the following claims.

What is claimed is:

1. An automatic seatbelt system for automatically fastening and unfastening a seatbelt in a vehicle, comprising:
   a seatbelt including an end;
   an anchor plate connected to said end of the seatbelt;
   a guide means being fixed to a vehicle body, the guide means having a longitudinally extending groove therein in which the anchor plate is slidably mounted;
   a transmitting means for transmitting a driving force to the anchor plate, said transmitting means including a plurality of balls which have openings therein, a wire which extends through the openings of the balls, and a biasing means, said biasing means functioning to force adjacent balls of the plurality of balls toward each other, said biasing means being fixed to said wire; and
   a driving means for generating said driving force to move the transmitting means, thereby moving the anchor plate;
   whereby when a vehicle door opens, the driving means generates the driving force which is transmitted by the transmitting means to the anchor plate, thereby forwardly moving the seatbelt in the vehicle to enable a passenger to get in or out and whereby when the vehicle door closes, the driving means generates the driving force which is transmitted by the transmitting means to the anchor plate, thereby rearwardly moving the seatbelt in the vehicle to enable the passenger to fasten the seatbelt.

2. The automatic seatbelt system of claim 1, further comprising a flexible tube, said biasing means being located within said flexible tube, said flexible tube being fixed to said housing.

3. The automatic seatbelt system of claim 1, wherein the anchor plate includes a sliding portion, said wire being fixed to said sliding portion.

4. The automatic seatbelt system of claim 3, wherein the driving means includes a sprocket wheel which is fixed to a center pillar of the vehicle body and which is rotated by the driving means, the sprocket wheel including a peripheral portion which engages with the transmitting means.

5. The automatic seatbelt system of claim 4, further comprising a housing having L-shaped passages, said housing surrounding said sprocket wheel, said L-shaped passages functioning to guide said transmitting means.

6. The automatic seatbelt system of claim 3, wherein said wire includes an intermediate portion, a first end and a second end, said sliding portion being fixed to said first end of said wire.

7. The automatic seatbelt system of claim 6, wherein said second end of said wire is fixed to said biasing means.

8. The automatic seatbelt system of claim 7, wherein said plurality of balls fill said intermediate portion of said wire.

9. A seatbelt system for automatically fastening and unfastening a seatbelt in a vehicle, comprising:
   a seatbelt including an end;
   an anchor plate connected to said end of said seatbelt;
   a guide means being fixed to a vehicle body, the guide means having a longitudinally extending groove therein in which the anchor plate is slidably mounted;
   a transmitting means for transmitting a drive force to the anchor plate, said transmitting means including a plurality of balls which have openings therein, a wire which extends through the openings of said balls, and a biasing means, said wire including a first end, a second end and an intermediate portion, said balls covering said intermediate portion of said wire, said biasing means functioning to force adjacent balls of the plurality of balls toward each other, said biasing means being fixed to said wire; and
   a driving means for generating the driving force to move the transmitting means thereby moving the anchor plate;
   whereby when a vehicle door opens, the driving means generates the driving force which is transmitted by the transmitting means to the anchor plate thereby outwardly moving the seatbelt in the vehicle to enable the passenger to get in or out and whereby when the vehicle door closes, the driving means generates the driving force which is transmitted by the transmitting means to the anchor plate, thereby rearwardly moving the seatbelt in the vehicle to enable the passenger to fasten the seatbelt.

* * * * *